(12) United States Patent
Stephan

(10) Patent No.: US 11,472,331 B2
(45) Date of Patent: Oct. 18, 2022

(54) LASER LIGHT SAFETY GUIDE

(71) Applicant: Michael F. Stephan, St. Croix Falls, WI (US)

(72) Inventor: Michael F. Stephan, St. Croix Falls, WI (US)

(73) Assignee: Michael F. Stephan, St. Croix Falls, WI (US)

( * ) Notice: Subject to any disclaimer, the term of this patent is extended or adjusted under 35 U.S.C. 154(b) by 172 days.

(21) Appl. No.: 17/085,112

(22) Filed: Oct. 30, 2020

(65) Prior Publication Data

US 2021/0129742 A1 May 6, 2021

Related U.S. Application Data

(60) Provisional application No. 62/929,978, filed on Nov. 4, 2019.

(51) Int. Cl.
| | | |
|---|---|---|
| *G08B 21/00* | (2006.01) | |
| *B60Q 1/24* | (2006.01) | |
| *E01H 5/06* | (2006.01) | |

(52) U.S. Cl.
CPC ............... *B60Q 1/24* (2013.01); *E01H 5/067* (2013.01)

(58) Field of Classification Search
CPC .. B60Q 1/24; B60Q 2400/50; B60Q 2800/20; B60Q 1/50; E01H 5/067
USPC ......................................................... 340/463
See application file for complete search history.

(56) References Cited

U.S. PATENT DOCUMENTS

| | | | |
|---|---|---|---|
| 3,727,332 | A | 4/1973 | Zimmer |
| 4,768,958 | A | 9/1988 | Suddaby |
| 4,978,246 | A | 12/1990 | Quenzi et al. |
| 5,052,854 | A | 10/1991 | Correa et al. |
| 5,387,853 | A | 2/1995 | Ono |
| 5,390,118 | A | 2/1995 | Margolis et al. |
| 5,505,000 | A | 4/1996 | Cooke |
| 5,875,408 | A | 2/1999 | Bendett et al. |
| 6,108,031 | A | 8/2000 | King et al. |
| 6,184,800 | B1 | 2/2001 | Lewis |
| 6,198,386 | B1 | 3/2001 | White, II |
| 6,203,112 | B1 | 3/2001 | Cook et al. |

(Continued)

OTHER PUBLICATIONS

Slaughter et al., "Vision-based Low Cost Field Demonstrable Paint Restriping Guidance System," California AHMCT Program, University of California, Davis, California Department of Transportation, AHMCT Research Report UCD-ARR-01-09-14-02, Feb. 2020, 62 pages.

(Continued)

*Primary Examiner* — Mark S Rushing
(74) *Attorney, Agent, or Firm* — DeWitt LLP

(57) ABSTRACT

The laser light safety guide to assist in guiding a prime mover utilize for snowplowing including a laser that can be mounted within a cab of the prime mover and oriented to emit a visible laser beam directed through a transparent structure the prime mover. The laser light safety guide further comprises a shielding structure opaque to the visible laser beam that is trimmable or adjustable to enclose a space extending from a portion of the laser from which the visible laser beam is emitted to the transparent structure the prime mover. The shielding structure mitigates or contains reflection of the visible laser beam from an interior surface of the transparent structure.

20 Claims, 4 Drawing Sheets

(56) References Cited

U.S. PATENT DOCUMENTS

| | | |
|---|---|---|
| 6,464,380 B1 | 10/2002 | Young, Jr. |
| 6,736,216 B2 | 5/2004 | Savard et al. |
| 6,743,089 B2 | 6/2004 | Driller |
| 6,883,947 B1 | 4/2005 | Sarabia |
| 6,900,425 B1 | 5/2005 | Aliev et al. |
| 6,900,724 B2 | 5/2005 | Johnson |
| 6,946,973 B1 | 9/2005 | Yanda |
| 7,195,423 B2 | 3/2007 | Halonen et al. |
| 7,293,923 B2 | 11/2007 | Tung |
| 7,573,921 B2 | 8/2009 | Yumoto et al. |
| 7,630,424 B2 | 12/2009 | Ershov et al. |
| 7,966,753 B2 | 6/2011 | Vanneman t al. |
| 8,205,360 B1 | 6/2012 | Vanneman et al. |
| 8,887,412 B2 | 11/2014 | Proeber et al. |
| 9,255,811 B2 | 2/2016 | Edelen |
| 2003/0107900 A1 | 6/2003 | Ellison |
| 2004/0145900 A1 | 7/2004 | Camp |
| 2005/0280897 A1* | 12/2005 | Derenski ................ G02B 5/208 359/612 |
| 2006/0187010 A1 | 8/2006 | Berman |
| 2007/0157490 A1* | 7/2007 | Vanneman ................ E01H 5/00 37/241 |
| 2007/0234597 A1* | 10/2007 | Schpok .................. E01H 5/066 37/231 |
| 2008/0178497 A1* | 7/2008 | DiMauro ................ E01H 5/066 37/231 |
| 2014/0268703 A1* | 9/2014 | Ehlert .................... F21L 4/027 362/208 |

OTHER PUBLICATIONS

Yen et al., "Development of an Advanced Snowplow Driver Assistance System (ASP-II)," California AHMCT Program, University of California at Davis, California Department of Transportation, Jun. 30, 2000, 101 pages.

* cited by examiner

LASER LIGHT SAFETY GUIDE

CROSS-REFERENCE TO RELATED APPLICATION

The present application claims the benefit of U.S. Provisional Application No. 62/929,978, filed Nov. 4, 2019, which is hereby incorporated herein in its entirety by reference.

TECHNICAL FIELD

The invention generally relates to snowplowing of streets, roads and highways using heavy equipment. More particularly, the invention relates to guiding of heavy equipment used for snowplowing for accuracy of plowing and avoidance of obstructions.

BACKGROUND

For decades snow removal has been performed by large equipment such as trucks. Other vehicles are utilized as well including tractors, graders, skid steer loaders and the like. Cities and other agencies across the northern part of the country deploy tens of thousands of trucks every time it snows in an effort to provide safe travel conditions for the citizens and other travelers using the roadways. The trucks are typically equipped with snow plows to push, direct or plow the snow laterally to one or both sides of the truck or other vehicle and thus off the road. This clears a path for traffic behind the truck. Following traffic then has a path cleared of snow to drive on after the truck has passed through.

The trucks are usually equipped with one or more snow plows for this task. A common practice is to mount a front plow, as well as a side (wing) plow to increase the effective width of a swath of cleared pavement that a single truck can make. The larger the swath width, the more efficient a single operator and piece of equipment can be. However, increasing the effective plowing width by adding a side (wing) plow may create safety concerns. The operator of a snow plow truck not only must safely operate a large vehicle on slippery snow covered roadways, often times at night and during a snowstorm, but the driver must operate the snow plow and other equipment that the truck is equipped with in a safe and productive manner. Snow not only covers the road in these circumstances, but also conceals obstacles from view and falling snow may further obscure vision.

Traction and steering are also negatively impacted by the snow on the pavement, and visibility is often poor even with the most advanced windshield wipers and cab heating/windshield defrosting systems available. Snow removal specifications in most areas of the country demand fast and efficient snow removal so that the time that the snow sits on the roadways is diminished as much as possible. The longer the snow is on the pavement, the more difficult it is to remove and the more likely it is to have a negative effect on traffic flow and safety. All of these environmental, speed, and multi-tasking factors make it difficult for even the most skilled operators to perform this job without a single safety incident or accident.

Over time, various aids have been developed to help increase operator awareness and ability to control and avoid accidents while operating large vehicles, especially those with side (wing) plows on snow covered roads.

One method to help increase operator awareness and safety while operating a wing plow is disclosed by Mr. Edelen in U.S. Pat. No. 9,255,811B2 and another is disclosed by Proeber et al in U.S. Pat. No. 8,887,412B2. These patents both represent attempts to help inform an equipment operator of upcoming obstacles, and provide the operator with forewarning of a potential encounter with an obstacle. One of these disclosures involves a heads up display which projects images overlying an operator's field of view from the cab. The other involves a computer controlled screen that presents the operator with an image of the forward view. Both of these methods require complicated tracking systems, which are prone to failure and may require too much monitoring and understanding by the operator, only adding to the complexity of the task that the operator is required to perform. Another approach is taught by U.S. Pat. No. 7,966,753B2. In this invention the operator is presented with a bright dot of light projected in front of the vehicle, aligned with the side (wing) plow so that the operator can make counter—adjustments to the direction of travel to avoid contact with obstacles. This invention is notably more simple and operator friendly, but requires the use of heat or compressed gas to keep the surface of the externally mounted light emitting lens clean.

Accordingly, there is still room for improvement in the art of guiding snowplow drivers to assist in avoiding contact with obstacles.

SUMMARY

Example embodiments of the invention help to improve safe operation of a wing plow mounted to trucks and other vehicles equipped with side (wing) plows. Personnel operating a prime mover equipped with a side wing plow or plows must estimate within inches where the side (wing) plow will be as it travels along and next to obstacles. Some examples of these obstacles are parked vehicles, street signs, mailboxes and guard rails. The list of potential obstacles is extensive. The operator is constantly engaged in trying to remove snow from a pavement surface as quickly and thoroughly as possible, and at the same time avoiding contact with obstacles. Over time, operators may be able to train themselves to plow snow close to the obstacles without making contact, but since there are so many variables to keep track of and other distractions that may occur, good operators still make contact with obstacles from time to time. In addition, even experienced are subject to fatigue and its negative effect on performance of these tasks. Example embodiments of the present invention are expected to reduce the number of times contact will occur by decreasing the number of instances of estimation the operator is required to make, and increasing the awareness and precision of the operator.

The invention will be discussed in the context of a truck that includes a front mounted plow as well as a wing plow. It is to be understood that this is an example. Example embodiments of the invention may be appropriately utilized with any prime mover that is used for snow removal.

According to an example embodiment, the invention includes a laser that is projected from within the cab of the vehicle which the side (wing) plow is mounted to. The laser projects a bright line or dot onto the ground approximately, for example, two vehicle lengths ahead of the vehicle, and off to one side (the wing plow side) aligned with the straight forward motion of the outer edge of the side (wing) plow. That is, the bright line or dot is located where the outer edge of the wing plow will be if the vehicle continues in a straight line without deviation and steering for two vehicle lengths. The projected line or dot provides a visual indication to the operator of where the outer edge of the side (wing) plow will be if the vehicle continues to travel in a straight direction.

Example embodiments of the invention project the line or dot of light from inside the cab of the vehicle, through the windshield, and approximately 1-4 vehicle lengths ahead of the moving vehicle. By projecting the light through the windshield of the vehicle, the need to keep the lens of the laser light source clean is mitigated. The windshield of vehicles used for snow plowing, nearly uniformly, are already equipped with features for keeping the windshield clear for operator visibility. These features include various kinds of defrosters and windshield wipers.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
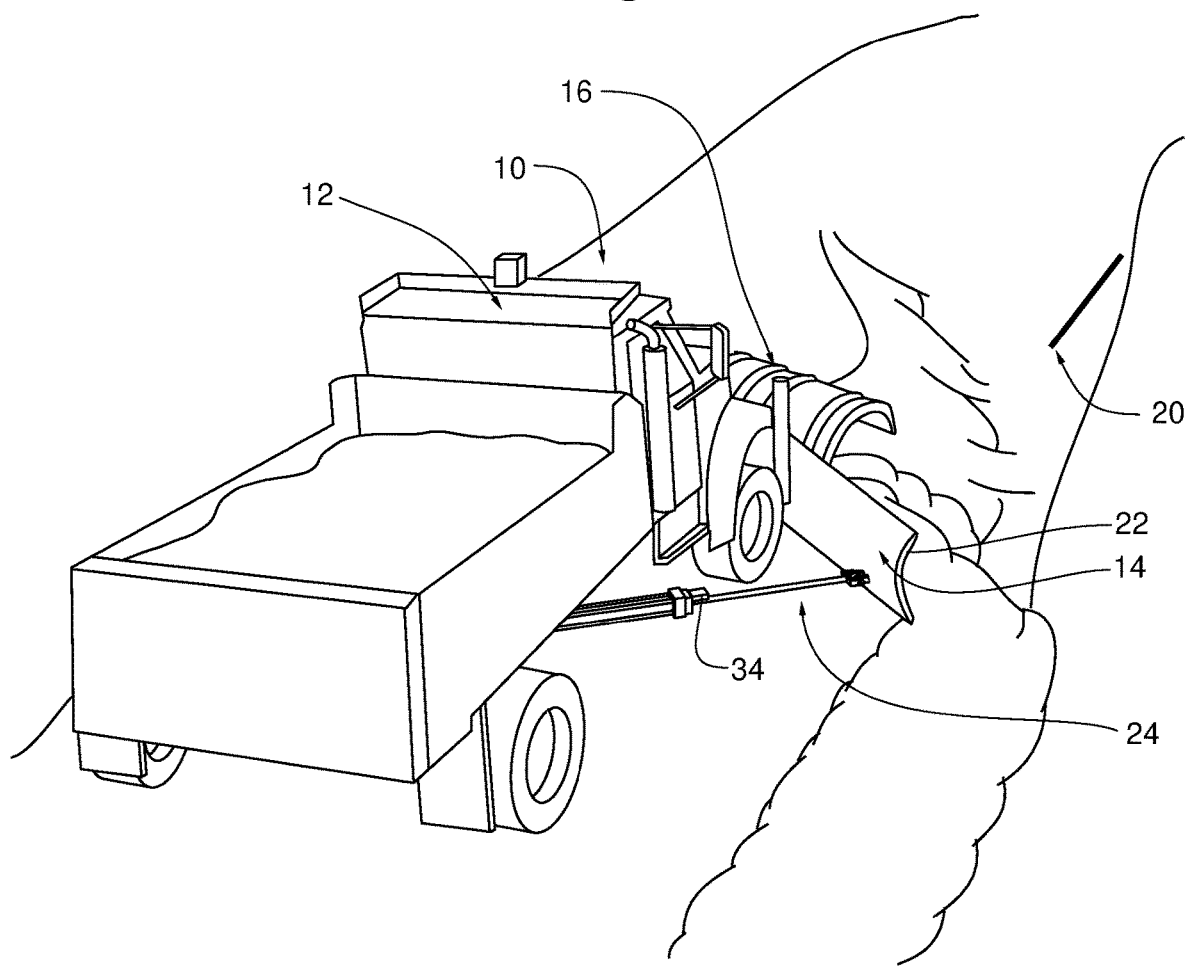
FIG. 1 is a perspective rear view of a snowplow truck including a side angle plot plow depicting features of an example embodiment of the invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Figure 2:
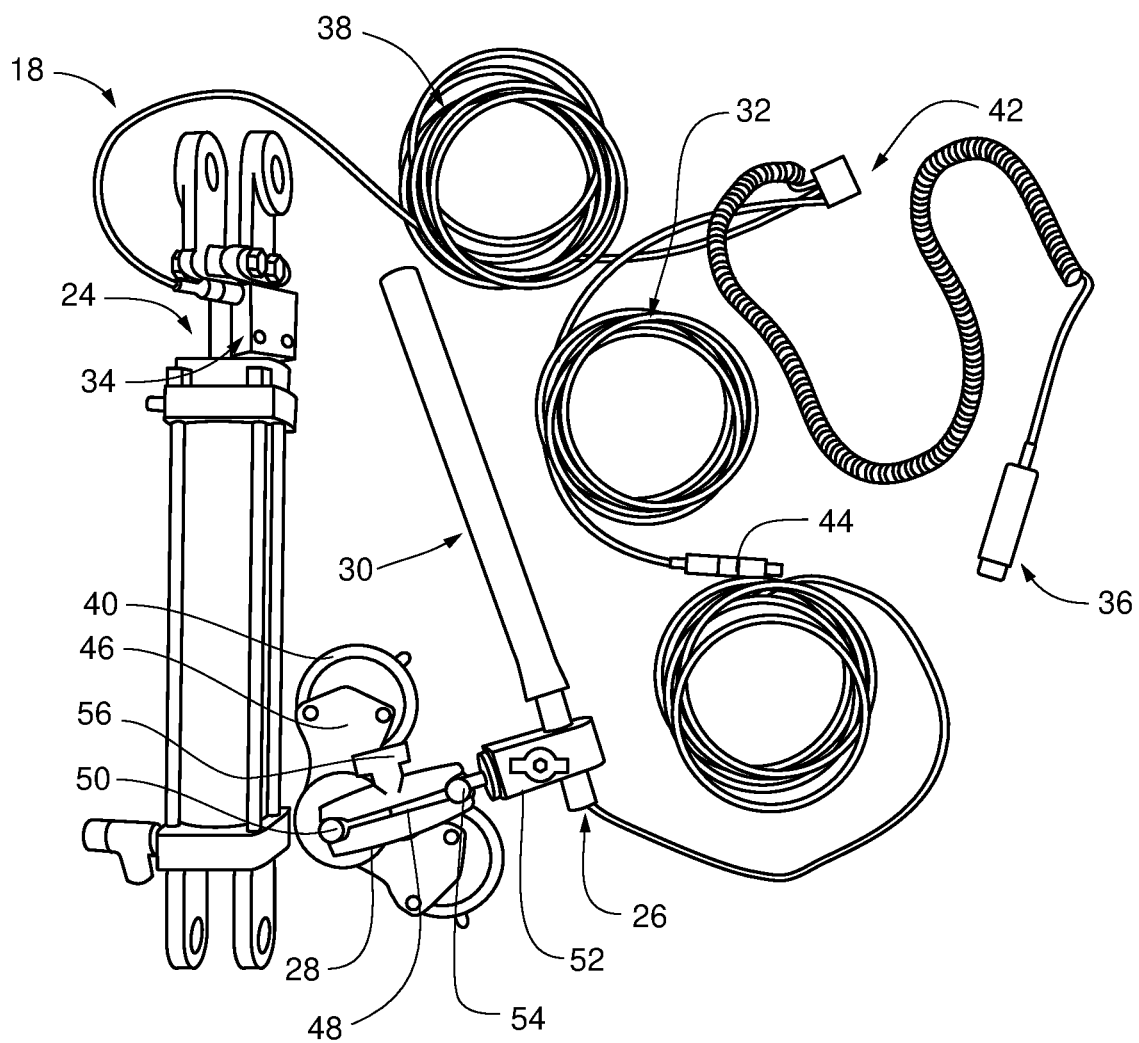
FIG. 2 is a plan view of components of an example embodiment of the invention in an uninstalled state.
Figure 3:
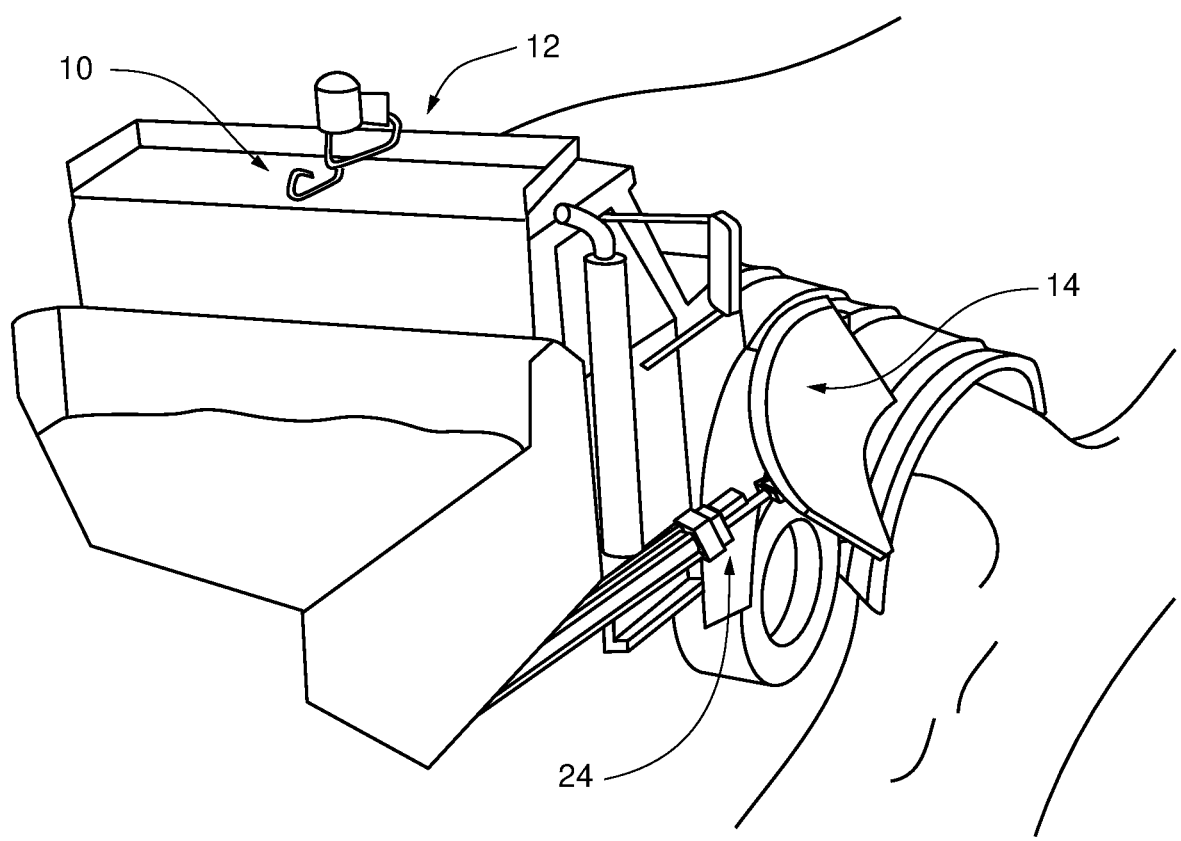
FIG. 3 is a perspective rear view of a snowplow truck as depicted in FIG. 1 with the side angle plow retracted according to an example embodiment of the invention.
Figure 4:
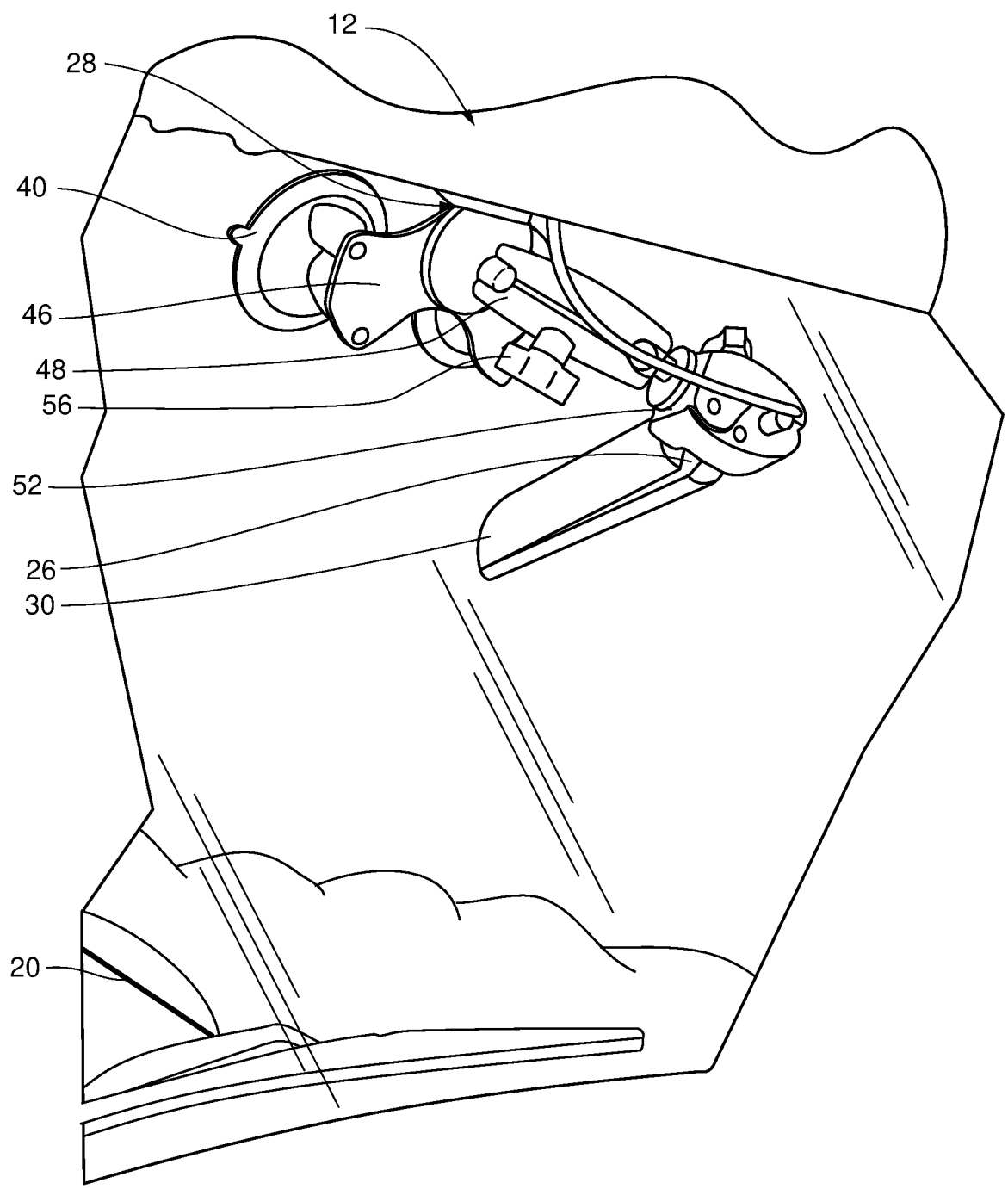
FIG. 4 is a perspective view of the laser guide according to an example embodiment of the invention installed in the cab of a snowplow truck.

Referring to FIG. 1, example embodiments of the invention are utilized for example with a snowplow prime mover 10 such as plow truck 12 that utilizes an angled side or wing plow 14. Prime mover 10 may also include front plow 16. Laser Guide 18 is depicted in FIGS. 2 and 4. Laser guide 18 according to an example embodiment of the invention projects laser line or spot 20 ahead of prime mover 10 aligned with an expected position of outer edge 22 of wing plow 14 if prime mover 10 continues to travel in a straight direction. Angled side or wing plow 14 further includes angle cylinder 24. Angle cylinder 24 is coupled between plow truck 12 and angled side or wing plow 14.

Front plow 16 is located in front of prime mover 10 angled side or wing plow 14 extends outwardly to one side of prime mover 10. Typically in the United States angled side or wing plow 14 extends out from a right side of prime mover 10. In other countries, where the opposite side of the road is driven on, this arrangement is typically reversed.

Referring now to FIG. 2, an example embodiment of the invention is depicted uninstalled including its component parts.

Laser guide 18 generally includes laser 26, mounting bracket 28, laser tube 30, power cord 32, switch 34, power source coupler 36, and sensor wire 38.

Laser 26 is a visible light laser of sufficient power to project visible line or spot 20 through windshield to be visible at a location one to four vehicle lengths ahead of prime mover 10. Laser 26 is coupled to the laser tube 30 which is mounted coaxially to the optical axis of laser 26 and which is made of a material which is readily cut to length during installation.

Power cord 32 includes junction box 42 and is coupled between laser 26 and junction box 42. Power cord 32 may further include coupler 44. Power cord 32 supplies electrical power to laser 26 for example from an electrical system of prime mover 10.

Switch 34 is electrically coupled to junction box 42 and structured to be physically mountable upon, for example, hydraulic cylinder 46 that extends and retracts angled side or wing plow 14. Switch 34 may include, for example, a normally closed switch that is mounted so that retraction of hydraulic cylinder 46 opens the contacts of switch 34. Switch 34 may also be mounted to another structure such that switch 34 is opened when angled side or wing plow 14 is in a retracted position. In addition, switch 34 is closed when angled side or wing plow 14 is in an extended position.

Power source coupler 36 is for example structured to plug into a cigarette lighter or other connection to the electrical system of prime mover 10. The form of power source coupler 36 is dependent upon the electrical system of prime mover 10. Any sort of power source coupler 36 may be utilized so long as it allows access to the electrical system a prime mover 10. Alternately, power source coupler 36 may be hardwired to the electrical system a prime mover 10.

Sensor wire 38 extends between switch 34 and Junction box 42 in this example embodiment. Sensor wire 38 may be a 2 conductor wire.

Mounting bracket 28 is coupled to and supports laser 26. According to an example embodiment of the invention mounting bracket 28 includes suction cups 40 which are sized and structured to be capable of supporting laser 26 when secured to, for example, an interior of windshield of prime mover 10. In the depicted embodiment, suction cups 40 are mounted to suction cup mounting plate 46. Suction cup mounting plate 46 is further connected to dual joint tilter bracket 48. Dual joint tilter bracket is coupled to suction cup mounting plate 46 via first ball joint 50 and also coupled to laser gripper 52 by second ball joint 54. Adjustment knob 56 facilitates tightening and loosening of first ball joint 50 and second ball joint 54.

Laser gripper 52 is articulable about both first ball joint 50 and second ball joint 54. This facilitates aiming of laser 26.

According to a further example embodiment of the invention, a method of assisting in guiding a prime mover utilized for snow plowing includes locating or mounting a laser within a cab of the prime mover and orienting the laser to admit a visible laser beam through a transparent structure the prime mover such as a windshield. The example method further includes orienting the laser such that the visible laser beam strikes the ground at a selected distance ahead of the prime mover. The example method further includes placing a shielding structure that is opaque to the visible laser beam to enclose a space extending between a portion of the laser from which the visible laser beam is emitted and an interior surface of the transparent structure the prime mover. This then mitigates or contains reflection of the visible laser beam from the interior surface of the transparent structure.

According to another example embodiment the method further includes mounting a switch to an external structure of the prime mover and to an externally mounted snowplow coupled to the prime mover such that the switch is operable the switch the laser on when the externally mounted snowplow is in an extended orientation and to switch the laser off when the externally mounted slow plow is in a retracted orientation.

According to another example embodiment, the method further includes mounting a bracket in contact with the transparent structure the prime mover through which the visible laser beam is directed.

According to another example, the method further includes articulating a joint located between the mounting bracket and laser to aim the laser through the transparent structure the prime mover through which the laser beam is directed.

According to a further example embodiment, the method further includes mounting the shielding structure coaxially to the laser. In another embodiment the method further includes trimming the shielding structure with a knife or scissors to abut an interior surface of the transparent structure the prime mover through which the visible laser beam is directed.

In accordance with the further example, the method further includes adjusting the laser to project a line of light or a dot of light outwardly away from the prime mover forward of the prime mover to a location in which an outer edge of an externally mounted snowplow is expected to pass if the prime mover continues to move forward in a straight direction.

In yet another example the method further includes extending an externally mounted snowplow thereby switching on the laser and retracting the externally mounted snowplow thereby switching off the laser.

In operation, according to a an example embodiment, laser 26 is mounted within the cab of prime mover 10 so that laser 26 of laser guide 18 is directed outwardly away from prime mover in a forward direction. Line or spot 22 is directed to a location ahead of prime mover 10 and at a position which outer edge 22 of angled side or wing plow 14 is expected to pass if prime mover 10 continues forward in a straight direction.

According to an example embodiment laser 26 is mounted to laser gripper 52 of mounting bracket 28 and suction cups 40 are engaged to an interior surface of a transparent structure of prime mover 10 such as the windshield. Dual joint tilter bracket is located between suction cup mounting plate 46 and laser gripper 52. Adjustment knob 56 of dual joint tilter bracket 48 can be manipulated to orient laser 26 and secure it in a desired position and orientation. Laser tube 30 is coupled to laser 26 and trimmed as needed so that a distal end of laser tube 30 abuts an interior of the windshield or transparent structure of the of prime mover 10. Laser tube 30 then contains any reflected laser light that is reflected from an interior surface of the windshield.

Switch 34 is mounted for example on angle cylinder 24 in such a way that switch 34 is open when angled side or wing plow 14 is retracted and closed when angled side or wing plow 14 is extended. Power cord 32 and sensor wire 38 are routed appropriately so that switch 34 is electrically coupled to laser 26 and power cord 32 is electrically coupled to power source 36 and to an electrical system of prime mover 10. Switch 34 may be mounted on another fixed structure external to prime mover 10 or to angled side or wing plow 14 so that switch 34 actuates laser 26 when angled side or wing plow 14 is extended and shuts off power to laser 26 when angled side or wing plow 14 is retracted.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A laser light safety guide to assist in guiding a prime mover utilized for snowplowing, comprising:
a laser mountable within a cab of the prime mover and orientable to emit a visible laser beam directed through a transparent structure of the prime mover;
a shielding structure opaque to the visible laser beam emitted by the laser that is trimmable or adjustable to enclose a space extending between a portion of the laser from which the visible laser beam is emitted to the transparent structure of the prime mover whereby reflection of the visible laser beam from an interior surface of the transparent structure of the prime mover is contained or mitigated; and
a switch mountable to a structure of the prime mover such that the switch is operable to switch the laser on when the externally mounted snowplow is in an extended orientation and to switch the laser off when the externally mounted snowplow is in a retracted orientation.

2. The laser light safety guide as claimed in claim 1, wherein the switch is mountable to an external structure of the prime mover and to an externally mounted snowplow coupled to the prime mover to switch the laser on when the externally mounted snowplow is in the extended orientation and to switch the laser off when the externally mounted snowplow is in the retracted orientation.

3. The laser light safety guide as claimed in claim 1, further comprising a mounting bracket that facilitates mounting the laser in contact with the transparent structure of the prime mover through which the visible laser beam is directed.

4. The laser light safety guide as claimed in claim 3, wherein the mounting bracket further comprises at least one suction gripper operable to engage to the transparent structure of the prime mover through which the visible laser beam is directed.

5. The laser light safety guide as claimed in claim 3, wherein the mounting bracket further comprises an articulated joint that facilitates aiming of the laser.

6. The laser light safety guide as claimed in claim 5, wherein the articulated joint further comprises a dual joint tilter bracket.

7. The laser light safety guide as claimed in claim 3, wherein the switch is structured to be mountable on an angle cylinder that is external to the cab of the prime mover and that is operable to shift the externally mounted snowplow between the extended position and the retracted position.

8. The laser light safety guide as claimed in claim 1, wherein the shielding structure is mounted coaxially to the laser.

9. The laser light safety guide as claimed in claim 1, wherein the shielding structure is formed of a material that is readily trimmed with a knife or scissors.

10. The laser light safety guide as claimed in claim 1, wherein the laser is structured or further comprises suitable optics to project a line of light outwardly away from the prime mover in a direction forward of the prime mover.

11. The laser light safety guide as claimed in claim 1, wherein the shielding structure is shaped and sized to abut an interior surface of the transparent structure of the prime mover.

12. A method of assisting in guiding a prime mover utilized for snowplowing, comprising:
   locating and mounting a laser within a cab of the prime mover;
   orienting the laser to emit a visible laser beam through a transparent structure of the prime mover;
   further orienting the laser such that the visible laser beam strikes the ground at a selected distance ahead of the prime mover;
   placing a shielding structure opaque to the visible laser beam to enclose a space extending between a portion of the laser from which the visible laser beam is emitted and an interior surface of the transparent structure of the prime mover thereby containing or mitigating reflection of the visible laser beam from the interior surface of the transparent structure; and
   mounting a switch to a structure of the prime mover such that the switch is operable to switch the laser on when the externally mounted snowplow is in an extended orientation and to switch the laser off when the externally mounted snowplow is in a retracted orientation.

13. The method as claimed in claim 12, further comprising mounting the switch to an external structure of the prime mover and to an externally mounted snowplow coupled to the prime mover such that the switch is operable to switch the laser on when the externally mounted snowplow is in the extended orientation and to switch the laser off when the externally mounted snowplow is in the retracted orientation.

14. The method as claimed in claim 12, further comprising mounting a bracket in contact with the transparent structure of the prime mover through which the visible laser beam is directed.

15. The method as claimed in claim 14, further comprising utilizing at least one suction gripper to engage to the transparent structure of the prime mover through which the laser beam is directed.

16. The method as claimed in claim 14, further comprising articulating a joint located between the mounting bracket and the laser to aim the laser through the transparent structure of the prime mover through which the laser beam is directed.

17. The method as claimed in claim 12, further comprising mounting the shielding structure coaxially to the laser.

18. The method as claimed in claim 12, further comprising trimming the shielding structure with a knife or scissors to abut an interior surface of the transparent structure of the prime mover through which the visible laser beam is directed.

19. The method as claimed in claim 12, further comprising adjusting the laser to project a line of light or a dot of light outwardly away from the prime mover in a direction forward of the prime mover in a location at which an outer edge of an externally mounted snowplow is expected to pass if the prime mover continues to move in a forward direction.

20. The method as claimed in claim 12, further comprising extending an externally mounted snowplow thereby switching on the laser and retracting the externally mounted snowplow thereby switching off the laser.

* * * * *